United States Patent [19]

Krakowiak et al.

[11] Patent Number: 5,393,892
[45] Date of Patent: Feb. 28, 1995

[54] PROCESSES FOR REMOVING, SEPARATING AND CONCENTRATING LEAD, THALLIUM, ALKALI METALS, ALKALINE EARTH METALS FROM CONCENTRATED MATRICES USING MACROCYCLIC POLYETHER CRYPTAND LIGANDS BONDED TO INORGANIC SUPPORTS

[75] Inventors: Krzysztof E. Krakowiak, Provo; Bryon J. Tarbet, Highland; Haoyun An, Provo; Deborah F. Johnson; Ronald L. Bruening, both of Salt Lake City, all of Utah

[73] Assignee: IBC Advanced Technologies, Inc., Provo, Utah

[21] Appl. No.: 58,437

[22] Filed: May 7, 1993

[51] Int. Cl.$^6$ .............. C22B 26/10; C22B 26/20; C07D 323/00; C07D 325/00
[52] U.S. Cl. .................... 549/214; 549/208; 75/722
[58] Field of Search ............... 75/722; 549/208, 214

[56] References Cited

U.S. PATENT DOCUMENTS

| | | | |
|---|---|---|---|
| 4,186,175 | 1/1980 | Tomaja | 549/208 X |
| 4,199,513 | 4/1980 | Jong et al. | 549/208 X |
| 4,496,744 | 1/1985 | Atwood | 549/208 |
| 5,074,911 | 12/1991 | Austin et al. | 75/722 X |
| 5,078,978 | 1/1992 | Tarbet et al. | 75/722 X |
| 5,179,213 | 1/1993 | Bradshaw et al. | 549/214 X |
| 5,216,155 | 6/1993 | Laine et al. | 549/214 X |
| 5,228,903 | 7/1993 | O'Keefe | 75/722 X |
| 5,274,124 | 12/1993 | Holton | 549/214 |
| 5,332,420 | 7/1994 | Cupertino et al. | 75/722 X |

*Primary Examiner*—Paul F. Shaver
*Attorney, Agent, or Firm*—Thorpe, North & Western

[57] ABSTRACT

A method for the removal, separation, and concentration of alkali metal, alkaline earth metal, Pb and/or Tl cations from a source solution which may contain larger concentrations of other ions comprises bringing the source solution into contact with a compound comprising an oxygen donor macrocycle-containing ligand covalently bonded through an organic spacer silicon grouping to a solid inorganic support. The ligand portion(s) of the compound has affinity for alkali metal, alkaline earth metal, Pb and/or Tl thereby removing them from the source solution. The alkali metal, alkaline earth metal, Pb and/or Tl cations are then removed from the compound through contact with a much smaller volume of a receiving solution in which these cations are either soluble or which has greater affinity for such cations than does the oxygen donor macrocyclic ligand thereby quantitatively stripping the complexed cations from the ligand and recovering them in concentrated form in said receiving solution. The concentrated cations thus removed may be further separated and recovered by known methods. The process is useful in the removal of alkali metal, alkaline earth metal, Pb and Tl cations from a variety of source solutions such as from semiconductor, nuclear waste cleanup, metals refining, electric power, and other industrial enterprises. The invention is also drawn to the oxygen donor macrocycle-containing ligands covalently bonded through a spacer grouping to a hydrophilic inorganic solid support material.

32 Claims, No Drawings

PROCESSES FOR REMOVING, SEPARATING AND CONCENTRATING LEAD, THALLIUM, ALKALI METALS, ALKALINE EARTH METALS FROM CONCENTRATED MATRICES USING MACROCYCLIC POLYETHER CRYPTAND LIGANDS BONDED TO INORGANIC SUPPORTS

FIELD OF THE INVENTION

This invention relates to a process for removing, concentrating, and separating Pb, Tl, alkali metals and alkaline earth metals from concentrated matrices wherein these metals are present as cations which may be admixed with other cations, acids and other chemicals which may be present in much higher concentrations by the use of oxygen donor macrocyclic polyether cryptand ligands covalently bonded to inorganic solid supports. More particularly, this invention relates to a process for removing such Pb, Tl, alkali metal and alkaline earth metal cations from an admixture with other ions in solution by forming a complex of the Pb, Tl, alkali and alkaline earth metal cations with compounds composed of macrocyclic polyether cryptand ligands covalently bonded to inorganic matrix by flowing such solutions through a column, or similar means, packed with such macrocyclic polyether cryptand ligand materials and then selectively breaking the complex of the Pb, Tl, alkali and alkaline earth cations from the compounds to which such cations have become attached. The receiving solution is used in smaller volume to remove, separate, and concentrate the removed cations than the original volume of solution passed through the column. The Pb, Tl, alkali and alkaline earth metal cations thus removed may then be recovered by known methods.

BACKGROUND OF THE INVENTION

The separation of trace quantities of Pb, Tl, alkali metals, and alkaline earth metals from concentrated matrices containing other concentrated metal cations, acids, and/or other chemicals is a difficult, but important separation commercially. Industries where such separations are would be advantageous include the semiconductor, nuclear waste cleanup, metals refining, electric power, and other industrial enterprises. The separations are difficult because the metals to be removed are present only in concentrations ranging from parts-per-trillion (ppt) to low parts-per-million (ppm) levels and must be separated from up to several molar concentrations of the matrix chemicals. Hence, a kinetically rapid, highly selective, and strong thermodynamically interactive material is required for the separations.

Articles such as Nakatsuji et al., *A New Type of Macrobicyclic Polyether: Synthesis and Complexation of Alkali Metal Cations*, Journal of the Chemical Society Chemical Communications, 16, 1045 (1984), and Parsons, *Synthesis of Bridged Macrocyclic Polyethers of High Complexing Ability with Group 1a. Salts*, J. C. S. Perkin I, 451, (1978), describe three-dimensional molecules containing only oxygen donor atoms with selectivity for and interaction constants with some alkali metal cations and the potential for such with alkali, alkaline earth, Pb, and Tl cations. These molecules are very expensive to produce and have not yet been included in actual separation systems where their properties would be useful.

It would be desirable to formulate oxygen donor polyether macromolecular ligands of this type as well as related oxygen donor macromolecules with improved interaction and selectivity properties into a stable composition whereby the selective properties of the ligands for alkali metal, alkaline earth metal, Pb and Tl cations are maintained in an actual separation system and wherein the ligands can be reused hundreds or thousands of times to make separations. The reuse of such ligands makes their use economical and of significant industrial worth. These objectives are accomplished by means of with the covalent bonding of the appropriate oxygen donor macrocycles via the appropriate attachment arms to hydrophilic inorganic solid supports and the use of such compositions in actual separation processes.

SUMMARY OF THE INVENTION

The present invention is drawn to the selective removal of alkali, alkaline earth metal, Pb and Tl cations from complex matrices containing these ions along with other ions which may be present in greater concentrations but which are not targeted for removal by means of a solid supported oxygen donor macrocyclic ligand covalently bonded through a spacer grouping to a silicon containing moiety bonded to a solid support. The ions separated from the matrices are then removed from the ligand by elution using a receiving liquid. By alkali metal is meant those metals of Periodic Table Classification IA selected from the group consisting of lithium, sodium, potassium, rubidium and cesium. By alkaline earth metal is meant those metals of Periodic Table Classification IIA selected from the group consisting of beryllium, magnesium, calcium, strontium and barium. The preferred alkali metals are selected from the group consisting of sodium, potassium, rubidium and cesium. The preferred alkaline earth metals are selected from the group consisting of calcium, strontium and barium.

The solid supported oxygen donor macrocycle ligands which are covalently bonded through an appropriate spacer grouping to a silicon containing moiety and further covalently bonded to a solid 10 support and are represented by the following formula (Formula 1):

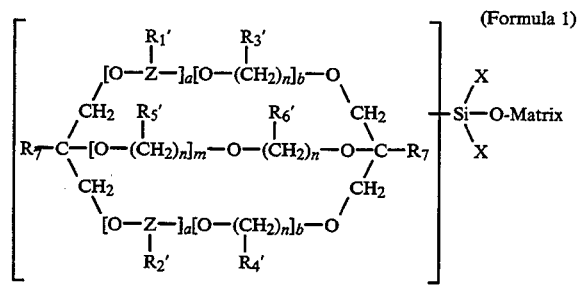

(Formula 1)

In Formula 1, $R_{3'}$, $R_{4'}$, $R_{5'}$ and $R_{6'}$ is H or a spacer formed from the reaction of a member selected from the group consisting of allyloxymethyl, alkylthio, alkylamino, carboxy, carboxyalkyl and epoxyalkyl with an —Si(X)(X)— moiety used for attachment to the —O—Matrix solid support. $R_7$ is a member selected from the group consisting of H, or alkyl. Z is a member selected from the group consisting of o-phenylene and o-naphthylene and $R_{1'}$ and $R_{2'}$ is H or a spacer formed from the reaction of a member selected from the group consisting of allyl, alkenyl, carboxy, carboxyalkyl, allyloxy, aminoalkyl, hydroxy, thio and alkylthio with an —Si(X)(X)— moiety used for attachment to the —O—Matrix solid support. In the above formula n is an integer of from 2 to 4, a is an integer of 0 or 1, b is an integer of 0 to 3 with the proviso that b must be at least 1 when a is 0, and m is an integer of 0 to 5. "Matrix" refers to a solid support material selected from the group consisting of sand, silica gel, glass, glass fibers, alumina, nickel oxide, zirconia, or titania, and equivalent substances. The X groups can be the same or different and are members selected from the group consisting of Cl, Br, I, alkyl, alkoxy, substituted alkyl or substituted alkoxy and O—matrix. When the X moieties are other than O—matrix they are functionally classified as leaving groups, i.e. groups attached to the silicon atom which, when reacted with an O-solid hydrophilic matrix material, may leave or be replaced by the O—matrix. If any such functional leaving groups are left over after reacting a silicon containing spacer group or spacer/ligand group with the solid hydrophilic matrix support material, these groups will have no direct function in the interaction between the desired ion and the oxygen donor macrocycle ligand-attached to the solid support. Whenever the terms "alkyl", "alkenyl" or "alkoxy" are used they refer to a 1–5 carbon member alkyl, alkenyl or alkoxy group which may be substituted or unsubstituted, straight or branched chain. By substituted is meant by groups such as Cl, Br, I, $NO_2$ and the like.

It is mandatory that one or two, and preferably only one, of the $R_1'$ through $R_6'$ groups must be a spacer reacted with an —Si(X)(X)— moiety used for attachment to the —O—Matrix solid support. The remaining $R_1'$ through $R_6'$ groups are H. In other words the oxygen donor macrocycle ligands are covalently bonded through an appropriate spacer grouping to a silicon containing moiety and further covalently bonded to a solid support.

The compositions of Formula 1 may be prepared by reacting an oxygen donor macrocycle ligand with a silicon containing moiety which, in turn is reacted with a solid support material.

An oxygen donor macrocycle ligand is initially obtained having a structure as defined in Formula 2 as follows:

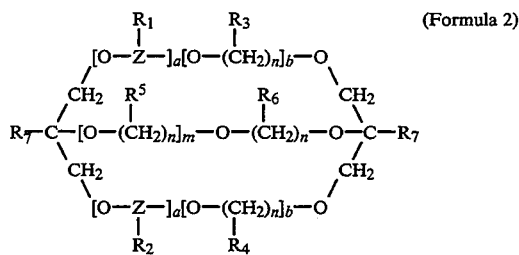
(Formula 2)

In Formula 2 $R_3$, $R_4$, $R_5$ and $R_6$ is each a member selected from the group consisting of H, allyloxymethyl, alkylthio, alkylamino, carboxy, carboxyalkyl and epoxyalkyl. $R_7$ is a member selected from the group consisting of H, or alkyl, Z is a member selected from the group consisting of o-phenylene and o-naphthylene, $R_1$ and $R_2$ is each a member selected from the group consisting of H, allyl, alkenyl, carboxy, carboxyalkyl, allyloxy, aminoalkyl, hydroxy, thio and alkylthio. In the above formula n is an integer of from 2 to 4, a is an integer of 0 or 1, b is an integer of 0 to 3 with the proviso that b must be at least 1 when a is 0, and m is an integer of 0 to 5.

In order to provide a spacer grouping to react with the silicon containing moiety, e.g. a silane, it is mandatory that one or two, and preferably only one, of the $R_1$ through $R_6$ groups must be other than H. The remaining $R_1$ through $R_6$ groups are H.

The oxygen donor macrocycle ligand, having a spacer grouping attached, may be prepared by various reaction schemes. Two are illustrated. The first involves the reaction of a cis dihydroxy crown ether with a polyether diol wherein the diol groups have been activated by reaction with a "leaving" group such as tosyl chloride. The following reaction sequence (Reaction A) shows the formation of an oxygen donor macrocycle ligand (Formula 2) by means of reacting a cis dihydroxy crown ether (Formula 3) with a tosylated polyether diol (Formula 4) as follows wherein Ts stand for the tosyl group and the remainder of the symbols have the same meaning as given for Formula 2 above:

REACTION A

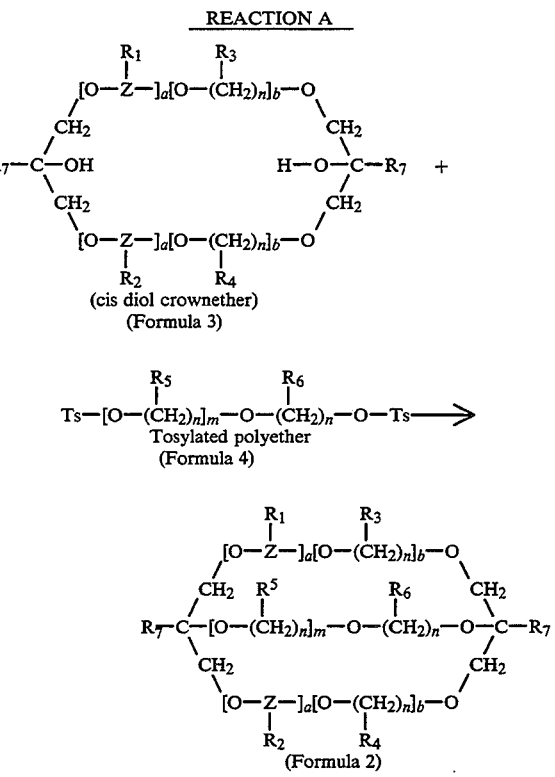

While the Ts or tosyl group is illustrated above, other leaving groups such as mesylates, chlorides, bromides and the like can also be utilized. The tosyl group is preferred because it is crystalline and has better reaction properties.

The second involves the reaction of a cis dibromomethyl crown ether with a polyether diol. The following reaction sequence (Reaction B) shows the formation of an oxygen donor macrocycle ligand (Formula 2) by means of reacting a cis dibromomethyl crown ether (Formula 5) with a polyether diol (Formula 6) as follows wherein symbols have the same meaning as given for Formula 2 above:

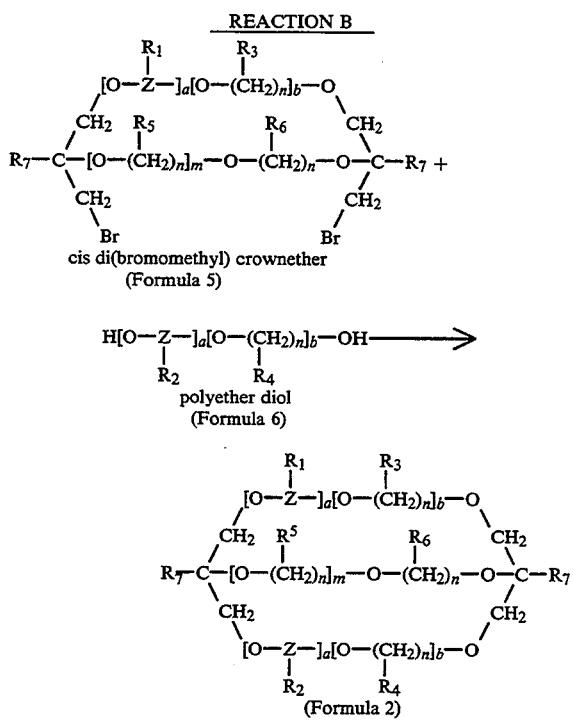

REACTION B cis di(bromomethyl) crownether
(Formula 5)

polyether diol
(Formula 6)

(Formula 2)

The compound corresponding to Formula 2, having an attached spacer grouping may then be reacted with a silane of the formula HO—Si(X)$_3$ to form an intermediate [Formula 2] —O—Si(X)$_2$ which is then in turn attached to a solid support by heating to form the composition of Formula 1. The attachment of a [Formula 2] —O—Si(X)$_2$ type compound with solid support is described in numerous prior art patents.

The oxygen donor macrocycle ligands covalently bonded to solid supports or matrices as shown in Formula 1 are characterized by selectivity for and removal of alkali, alkaline earth metal, Pb and Tl ions present in source solutions. Such source solutions are usually acidic matrices. As noted above, such ions are present in matrices produced by the semiconductor, nuclear waste cleanup, metals refining, electric power, and other industrial enterprises. The ions to be removed are generally present at low concentrations and are in admixture with other ions and complexing or chemical agents one does not desire to remove but which are present in much greater concentrations in the solution. The separation is effected in a separation device such as a column through which the solution is flowed.

Each of the ligands shown in Formula 2 may have certain advantages over others falling within the same formula used in the present invention. Symmetry seems to be important in the crown ether structure. Using Reaction A as an example, the use 1,8 diol-14-crown-4 or 1,11 diol-20-crown-6 is thought to function better than other isomeric diols which are not symmetric. Further, the diameter of the cavity within the crown will preferably match or closely approximate the diameter of the ion being removed.

The process of selectively removing and concentrating alkali, alkaline earth, Pb or Tl cations is characterized by the ability to quantitatively complex, from a larger volume of solution, these desired ion(s) when they are present at low concentrations. These ions are recovered from a separation column by flowing through it a small volume of a first receiving liquid which contains reagents which quantitatively remove these ions from the column. The recovery of the separated alkali, alkaline earth, Pb or Tl cations from the receiving phase or liquid can then be accomplished by known procedures.

DETAILED DESCRIPTION OF THE INVENTION

As summarized above, the present invention is drawn to the use of various oxygen donor macrocycle ligands covalently bound through a spacer to a silicon moiety and further attached to a solid matrix or support, (as represented by Formula 1), to remove, concentrate, and separate alkali, alkaline earth, Pb and Tl ions, from other ions and each other. Such solutions from which these ions are to be concentrated, separated, and/or recovered are referred to herein as "source solutions." In many instances the concentration of alkali, alkaline earth, Pb or Tl ions in the source solutions will be much less than the concentration of other ions from which they are to be separated.

The concentration of alkali, alkaline earth, Pb and/or Tl is accomplished through the formation of a ligand complex of the selected cations with a compound represented by Formula 1 by flowing a source solution containing the alkali, alkaline earth, Pb and/or Tl ions through a column packed with the compound to attract and bind the desired ions to the oxygen donor macrocyclic ligand portion of the compound. The ions thus complexed to the ligand are selectively removed from the compound by breaking the ligand/cation complex by flowing a receiving solution through the column. The receiving solution is used in much smaller volume than the volume of the initial source solution so that the alkali, alkaline earth metal, Pb and Tl ions recovered in the receiving liquid are in concentrated form relative to the source solution. The receiving liquids or recovery solutions are aqueous solutions in which the cations are either soluble or which has greater affinity for the cations than does the oxygen donor macrocyclic ligand. In either event, the desired ion(s) is quantitatively stripped from the ligand in concentrated form in the receiving solution. Once in the receiving liquid, the recovery of the alkali, alkaline earth metal, Pb and/or Tl can be accomplished using known procedures.

The oxygen donor macrocyclic ligands bound to solid supports as shown in Formula 1 may be prepared by various methods described above and illustrated in examples as set forth in the examples which follow.

EXAMPLE 1

In this example, the all-oxygen cryptand was prepared using Reaction A as follows: To a stirred solution of t-butyl alcohol was added 0.5 grams of potassium metal, which slowly dissolved. This was followed by 1.48 grams of a cis-1,8-dihydroxy-dibenzo-14-crown-4 corresponding to Formula 3 having an allyloxymethyl substituent on one of the benzo groups wherein a is 1, b is 0, Z is o-phenylene, R$_7$ is H, R$_1$ is 4-allyloxymethyl and R$_2$ is H. This material was prepared according to the following literature procedures from 1,1-(o-phenylenedioxy) bis-2,3-epoxypropane and 4-allylcatechol, *J. Med. Chem.* 17, 507 (1974); *J. C. S. Perkin I*, 451 (1978). The final ring closure was performed by adding 2.1 g of tetraethyleneglycolditosylate [Formula 4 where n is 2, m is 3 and R$_5$ and R$_6$ are H] over a period of 20 min. at 50°–55° C. The reaction mixture was stirred overnight at room temperature and then heated to 60° C. for 12 more hours. The reaction mixture was evaporated, extracted three times with chloroform-water and evaporated. The residue from the chloroform was decomplexed on alumina and purified using silica gel column chromatography. This yielded an all oxygen cryptand product of Formula 2 where a is 1, b is 0, Z is o-phenylene, $R_1$ is 4-allyl, m is 3, n is 2, and $R_7$, $R_2$, $R_5$ and $R_6$ are H.

This product was then hydrosilylated with a Pt catalyst and attached to the surface of 35–60 mesh silica gel by heating the silane-cryptand material in toluene for 6 to 18 hours. The final product corresponded to Formula 1 wherein a is 1, b is 0, Z is o-phenylene, $R_{1'}$ is a propylene spacer formed by the reaction of the 4-allyl group with the silane, n is 2, m is 3 and $R_7$, $R_{2'}$, $R_{5'}$ and $R_{6'}$ are H, X is either O-alkyl or O-silica gel and Matrix is silica gel. This product was air dried.

EXAMPLE 2

The procedure followed is the same as for Example 1 with the exception that the ditosylate used to close the final ring was triethyleneglycol ditosylate [Formula 4 where m is 2]. This provided a product corresponding to Formula 2 wherein a is 1, b is 0, Z is o-phenylene, $R_1$ is 4-allyl, n is 2, m is 2, $R_7$, $R_{2'}$, $R_{5'}$ and $R_{6'}$ are H. After attachment to silica gel the product corresponded to Formula 1 wherein a is 1, b is 0, Z is o-phenylene, $R_{1'}$ is propylene, n is 2, m is 2, $R_7$, $R_{2'}$, $R_{5'}$ and $R_{6'}$ are H, X is either O-alkyl or O-silica gel and Matrix is silica gel. This product was air dried.

EXAMPLE 3

The procedure followed is the same as for Example 1 with the exception that the ditosylate used to close the final ring was pentaethyleneglycol ditosylate [Formula 4 where m is 4]. This provided a product having Formula 2 wherein a is 1, b is 0, Z is o-phenylene, $R_1$ is 4-allyl, n is 2, m is 4, $R_7$, $R_2$, $R_5$ and $R_6$ are H. After attachment to silica gel the product corresponded to Formula 1 wherein a is 1, b is 0, Z is o-phenylene, $R_{1'}$ is propylene, n is 2, m is 4, $R_7$, $R_{2'}$, $R_{5'}$ and $R_{6'}$ are H, X is either O-alkyl or O-silica gel and Matrix is silica gel. This product was air dried.

EXAMPLE 4

In this example, an all oxygen cryptand without phenyl substituents was prepared using Reaction A. A diol comprising a cis-1,11-dihydoxymethylene-20-crown-6 corresponding to Formula 3 where a is 0, b is 2, n is 2 and $R_7$, $R_3$ and $R_4$ are H, was prepared from 1,11-methylene-20-crown-6 by modification of an existing procedure: Liebigs Ann. Chem. 75,736 (1970). This procedure involved oxidation with osmium tetroxide and sodium periodate followed by reduction with lithium aluminum hydride. Without separating the isomers, 0.165 g of the diol as prepared was dissolved in 50 ml of THF and 0.2 g of sodium hydride was added as the base. After stirring at room temperature, 1.1 g of an allyloxymethyl substituted triethylene glycol ditsoylate [Formula 4 where n is 2, m is 2, one $R_5$ is allyloxymethyl and the other $R_5$ and $R_6$ are H] was added as a solution in THF over a period of about 2 hours. The reaction was allowed to proceed for 5–15 hours and then refluxed for an additional 12–36 hours. The mixture was evaporated under reduced pressure and extracted with chloroform. The extract was dried over magnesium sulfate and filtered. After evaporating a second time the crude mixture was purified using silica and alumina column chromatography. The product prepared corresponds to Formula 2 where a is 0, b is 2, n is 2, m is 2, one $R_5$ is allyloxymethyl and $R'$, $R_3$, $R_4$, the other $R_5$ and $R_6$ are H.

The intermediate triethylene glycol ditsoylate with the internal allyloxymethyl group may be prepared according to a literature procedure; J. Het. Chem., 6711, (1986).

The purified material corresponding to Formula 3 was then reacted as above with triethoxysilane to obtain a material which could be attached to silica gel. The attachment was performed as in Example 1 above. This resulted in a product corresponding to Formula 1 wherein a is 0, b is 2, n is 2, m is 2, one $R_{5'}$ is a propyloxymethyl spacer formed by the reaction of the allyloxymethyl group with the silane and $R_7$, $R_{3'}$, $R_{4'}$, the other $R_{5'}$, and $R_{6'}$ are H, X is either O-alkyl or O-silica gel and Matrix is silica gel.

EXAMPLE 5

In this example, a compound containing 3 oxygens in each branch (i.e. interconnecting at the 1 and 11 positions) was prepared. The procedure followed is the same as for Example 4 with the exception that the ditosylate used to close the final ring was diethyleneglycol ditosylate [Formula 4 where m is 1 and $R_5$ is allyloxymethyl]. The product formed corresponded to Formula 2 where a is 0, b is 2, n is 2, m is 2, $R_5$ is allyloxymethyl and $R_7$, $R_3$, $R_4$ and $R_6$ are H.

As in Example 4 this product was reacted with triethoxysilane to obtain a material which could be attached to silica gel. The attachment was performed as in Example 1 above. This resulted in a product corresponding to Formula 1 wherein a is 0, b is 2, n is 2, m is 2, $R_{3'}$ is a propyloxymethyl spacer formed by the reaction of the allyloxymethyl group with the silane and $R_7$, $R_{3'}$, $R_{4'}$ and $R_{6'}$ are H, X is either O-alkyl or O-silica gel and Matrix is silica gel.

EXAMPLE 6

In this example Reaction B was utilized. First a diol corresponding to Formula 6 wherein a is 0, n is 2, b is 2, one $R_4$ is allyloxymethyl and the other $R_4$ is H, was deprotonated using sodium hydride as the base. To a stirred diol solution was then slowly added a di(bromomethyl) crown ether of Formula 5 wherein a is 0, n is 2, b is 1, m is 1 and $R_7$, $R_3$, $R_5$ and $R_6$ are H. The di(bromomethyl) crown ether may be prepared according to a procedure published in J. Chem. Soc. Commun., 1045, (1984). The solvents were removed under reduced pressure and the residue was extracted with dichloromethane. The crude product was purified by columnchromatography and corresponded to Formula 2 wherein a is 0, n is 2, m is 1, b (containing the $R_3$ group) is 1, the other b (containing the $R_4$ group) is 2, one $R_4$ is allyloxymethyl and $R_7$, $R_3$, the second $R_4$, $R_5$ and $R_6$ are H.

This product was reacted with triethoxysilane to obtain a material which could be attached to silica gel. The attachment was performed as in Example 1 above. This resulted in a product corresponding to Formula 1 wherein a is 0, n is 2, m is 1, b (containing the $R_3$ group) is 1, the other b (containing the $R_4$ group) is 2, one $R_{4'}$ is a propyloxymethyl spacer formed by the reaction of the allyloxymethyl group with the silane and $R_7$, $R_{3'}$, the other $R_{4'}$, $R_{5'}$ and $R_{6'}$ are H, X is either O-alkyl or O-silica gel and Matrix is silica gel.

EXAMPLE 7

In this example, the procedure outlined in Example 1 was followed with the exception that 2,3-dihydroxynaphthalene was used in place of the catechol of Example 1. This yielded an all oxygen ligand of Formula 2 wherein a is 1, b is 0, Z is o-naphthylene, $R_1$ is allyl, m is 3, n is 2, and $R_7$, $R_2$, $R_5$ and $R_6$ are H.

This product was then hydrosilylated with a Pt catalyst and attached to the surface of 35–60 mesh silica gel by heating the silane-cryptand material in toluene. The final product corresponded to Formula 1 wherein a is 1, b is 0, Z is o-naphthylene, $R_{1'}$ is a propylene spacer formed by the reaction of the allyl group with the silane, n is 2, m is 3 and $R_7$, $R_{2'}$, $R_{5'}$ and $R_{6'}$ are H, X is either O-alkyl or O-silica gel and Matrix is silica gel. This product was air dried.

EXAMPLE 8

In this example, an all oxygen cryptand without phenyl substituents was prepared similar to that of Example 4 using a diol comprising a cis-1,8-dihydoxymethylene-14-crown-4 corresponding to Formula 3 where a is 0, b is 1, n is 2 and $R_7$, $R_3$ and $R_4$ are H. As in Example 4, this was prepared from 1,8-methylene-14-crown-4 by modification of an existing procedure: *Liebigs Ann. Chem.* 75,736 (1970). To this was added an allyloxymethyl substituted tetraethylene glycol ditsoylate [Formula 4 where n is 2, m is 3, one $R_5$ is allyloxymethyl and the other $R_5$ and $R_6$ are H]. The product prepared corresponds to Formula 2 where a is 0, b is 1, n is 2, m is 3, one $R_5$ is allyloxymethyl and $R_7$, $R_3$, $R_4$, the other $R_5$ members and $R_6$ are H.

The above prepared material was then reacted as above with triethoxysilane and attached to silica gel as in Example 4. This resulted in a product corresponding to Formula 1 wherein a is 0, b is 1, n is 2, m is 3, one R is a propyloxymethyl spacer formed by the reaction of the allyloxymethyl group with the silane and $R_7$, $R_{3'}$, $R_{4'}$, the other $R_{5'}$ groups, and $R_{6'}$ are H, X is either O-alkyl or O-silica gel and Matrix is silica gel.

The process of selectively and quantitatively concentrating and removing alkali, alkaline earth metals, Pb and/or Tl, present at low concentrations from a plurality of other undesired ions which may be present at much higher concentrations comprises bringing the multiple ion containing source solution into contact with a oxygen donor macrocyclic ligand-containing solid supported compound as shown in Formula 1 which causes the alkali, alkaline earth metal, Pb and/or Tl species to complex with the oxygen donor macrocyclic ligand portion of the compound and subsequently breaking or stripping the complexed cation with a receiving solution in which the cations are either soluble or which has greater affinity for the cations than does the oxygen donor macrocyclic ligand. The receiving or recovery solution contain only the alkali, alkaline earth metal Pb and/or Tl ions respectively, in a concentrated form.

The oxygen donor macrocyclic ligand solid matrix support functions to attract the desired ions (DI) consisting of alkali, alkaline earth metal, Pb and/or Tl as a cationic complex according to Formula 7.

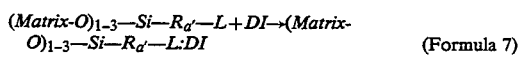

(Formula 7)

Except for DI and $R_{a'}$, Formula 7 is an abbreviated form of Formula 1 wherein L stands for the oxygen donor macrocyclic containing ligand. $R_{a'}$ stands for any of $R_{1'}$ through $R_{6'}$ spacer groupings DI stands for desired the alkali, alkaline earth metal, Pb or Tl ion being removed.

Once the alkali, alkaline earth metal, Pb and/or Tl cations are bound to the oxygen donor macrocycle-containing ligand, these complexed cations are subsequently separated from the solid materials in a separate receiving liquid by use of a smaller volume of a receiving liquid according to Formula 8:

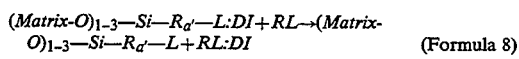

(Formula 8)

where RL stands for the receiving liquid.

The preferred embodiment disclosed herein involves carrying out the process by bringing a large volume of the source solution containing multiple ions as defined above, which solution contains hydrogen ions and may also contain other complexing and/or chelating agents, into contact with an oxygen donor macrocycle ligand-solid support compound of Formula 1 in a separation column through which the mixture is first flowed to complex the alkali, alkaline earth metal, Pb and/or Tl cations with the oxygen donor macrocyclic ligand-solid support compound as indicated by Formula 7 above, followed by the sequential flow through the column of a smaller volume of a receiving liquid as indicated by Formula 8 above.

Exemplary of receiving liquids, including concentrations and temperatures, which will strip alkali, alkaline earth, Pb and/or Tl cations from the ligand are 0.01 to 0.1M $Pb(NO_3)_2$ in 1M $HNO_3$, 0.03 to 0.3M $Li_4EDTA$, 0.03 to 0.5M $Li_5DTPA$, 0.01 to 0.1M $BaCl_2$ in 1M HCl, and 0.05 to 0.5M $Na_4P_2O_7$ and any others having similar properties which allow for the alkali, alkaline earth, Pb and/or Tl cations to be stripped from the column. The degree or amount of concentration of the receiving liquid will obviously depend upon the concentration of the alkali, alkaline earth, Pb and/or Tl cations in the source solution and the volume of source solution to be treated. The specific receiving liquids being utilized will also be a factor. Generally speaking, the concentration of desired ions in the receiving liquid will be from 20 to 1,000,000 times greater than when in the source solution. Other equivalent apparatus may be used instead of a column, e.g. a slurry which is filtered which is then washed with the receiving liquid to break the complexes and remove the cations. The concentrated cations are then recovered from the receiving liquid by known procedures familiar to those skilled in the art.

The following examples demonstrate how the oxygen donor macrocyclic-containing ligand bound to a solid support compound of Formula 1 may be used to remove, concentrate, and separate alkali, alkaline earth, Pb and/or Tl cation when they are present certain matrices. The oxygen donor macrocyclic ligand is placed in a column. An aqueous source solution containing certain cations of alkali, alkaline earth, Pb and/or Tl, in a mixture of other metal ions which may be present in a much greater concentration, is passed through the column. The flow rate for the solution may be increased by applying pressure with a pump on the top or bottom of the column or applying a vacuum in the receiving vessel. After the source solution has passed through the column, a much smaller volume of a recovery solution (receiving liquid), i.e., aqueous solutions in which the cations are either soluble or which has greater affinity for the cations than does the oxygen donor macrocyclic ligand, are flowed through the column. The recovery solution (receiving liquid) strips cations and collect them. These cations are now present in concentrated form for subsequent recovery. The preceding listings of receiving solutions are exemplary and other receiving solutions may also be utilized. The only limitation on the receiving solution is its ability to function to remove the alkali, alkaline earth, Pb and/or Tl from the oxygen donor macrocyclic ligand.

The following examples of separations and recoveries of cations utilize the inorganic support bound oxygen donor macrocyclic-containing ligands which were made as described in Examples 1 through 8. These examples are illustrative only and are not comprehensive of the many separations of ions that are possible using the compositions of Formula 1.

EXAMPLE 9

In this example, 0.5 g of the material from Example 1 were placed in a column. A 100 ml feed or source solution of 10 ppm Rb and Cs in 5M $HNO_3$ was passed through the column using gravity flow. The column was then washed with 5 ml of $H_2O$ to remove the $HNO_3$. Finally, the Rb and Cs were eluted using 5 ml of 0.01M $Pb(NO_3)_2$ in 1M $HNO_3$ as a receiving solution. An analysis of the feed solution showed that the Rb and Cs were removed to levels below the 1 ppm detection level of the atomic absorption (AA) spectrophotometer and an analysis of the recovery or receiving solution using the AA instrument showed that greater than 99% of the Rb and Cs originally in the 100 ml solution was in the 5 ml recovery solution.

EXAMPLE 10

In this example, 0.5 g of the material from Example 2 were placed in a column. A 100 ml of a feed or source solution of 100 ppb Na, K and Ca in 3M HCl was passed through the column using gravity flow, the column was then washed with 5 ml of $H_2O$ to remove the HCl. Finally, the Na, K and Ca were eluted using 5 ml of 0.01M $Pb(NO_3)_2$ in 1M $HNO_3$ as a receiving liquid. An analysis of the feed solution showed that the Na, K and Ca were removed to levels below 10 ppb using graphite furnace AA spectroscopy and an analysis of the recovery solution using flame AA spectroscopy showed that greater than 90% of the Na, K and Ca originally in the 100 ml Na, K and Ca was in the 5 ml recovery solution.

EXAMPLE 11

In this example, 0.5 g of the material from Example 3 were placed in a column. A 100 ml feed solution of 100 ppb Ba and Pb in 1M $HNO_3$ was passed through the column using gravity flow. The column was then washed with 5 ml of $H_2O$ to remove the $HNO_3$. Finally the Ba and Pb were eluted using 5 ml of 0.03M $Li_4$ EDTA as a recovery or receiving solution. An analysis of the feed solution showed that the Ba and Pb were removed to levels below the 1 ppb detection level of the graphite furnace AA spectrophotometer and an analysis of the recovery solution using Inductively Coupled Plasma (ICP) spectroscopy showed that greater than 95% of the Pb and Ba originally in the 100 ml Pb and Ba solution was in the 5 ml recovery solution.

EXAMPLE 12

In this example, 0.5 g of the material from Example 4 were placed in a column. A 100 ml feed solution of 10 ppm Cs in 0.1M $NaNO_3$ plus 1M $HNO_3$ was passed through the column using gravity flow. The column was then washed with 5 ml of 1M $HNO_3$ to remove the Na. Finally the Cs was eluted using 5 ml of 0.1M $Pb(NO_3)_2$ in 1M $HNO]$ as a recovery solution. An analysis of the feed solution showed that the Cs was removed to a level below the 1 ppm detection level of the Flame AA spectrophotometer and an analysis of the recovery solution again using flame AA showed that greater than 95% of the Cs originally in the 100 ml Cs solution was in the 5 ml recovery solution.

EXAMPLE 13

In this example, 0.5 g of the material from Example 5 were placed in a column. A 100 ml feed solution of 1000 ppb Sr in 0.1M $NaNO_3$ plus 1M $HNO_3$ was passed through the column using gravity flow. The column was then washed with 5 ml of $H_2O$ to remove the Na and $HNO_3$. Finally the Sr was eluted using 5 ml of 0.03M $Li_4$ EDTA as a recovery solution. An analysis of the feed solution showed that the Sr was removed to a level below the 1 ppb detection level of the graphite furnace AA and an analysis of the recovery solution using flame AA showed that greater than 95% of the Sr originally in the 100 ml Sr solution was in the 5 ml recovery solution.

EXAMPLE 14

In this example, 0.5 g of the material from Example 6 were placed in a column. A 100 ml feed solution of 10 ppm Ca in 1M HCl was passed through the column using gravity flow. The column was then washed with 5 ml of $H_2O$ to remove the HCl. Finally the Ca was eluted using 5 ml of 0.03M $Li_4$ EDTA as a recovery solution. An analysis of the feed solution showed that the Ca was removed to a level below the 0.5 ppm detection level of the flame AA spectrophotometer and an analysis of the recovery solution again using flame AA showed that greater than 95% of the Ca originally in the 100 ml Ca solution was in the 5 ml recovery solution.

EXAMPLE 15

In this example, 0.5 g of the material from Example 7 were placed in a column. A 100 ml feed solution of 10 ppm Cs in 1M $HNO_3$ was passed through the column using gravity flow. The column was then washed with 5 ml of $H_2O$ to remove the $HNO]$. Finally the Cs was eluted using 5 ml of 0.1M $Pb(NO_3)_2$ in 1M $HNO_3$ as a recovery solution. An analysis of the feed solution showed that the Cs was removed to a level below the 1 ppm detection level of the flame AA spectrophotometer and an analysis of the recovery solution again using flame AA showed that greater than 95% of the Cs originally in the 100 ml Cs solution was in the 5 ml recovery solution.

EXAMPLE 16

In this example, 0.5 g of the material from Example 8 were placed in a column. A 100 ml feed solution of 10 ppm Pb in 5M HCl and 0.1M NaCl was passed through the column using gravity flow. The column was then washed with 5 ml of $H_2O$ to remove the Na and HCl. Finally the Pb was eluted using 5 ml of 0.03M $Li_4$ EDTA as a recovery solution. An analysis of the feed solution showed that the Pb was removed to a level below the 0.5 ppm detection level of the flame AA and an analysis of the recovery solution using flame AA showed that greater than 95% of the Pb originally in the 100 ml Pb solution was in the 5 ml recovery solution.

EXAMPLE 17

In this example, 0.5 g of the material from Example 5 were placed in a column. A 100 ml feed solution of 10 ppm Tl in 1M $HNO_3$ and 0.1M $NaNO_3$ was passed through the column using gravity flow. The column was then washed with 5 ml of $H_2O$ to remove the Na and HCl. Finally the Tl was eluted using 5 ml of 0.03M $Li_4$ EDTA as a recovery solution. An analysis of the feed solution showed that the Tl was removed to a level below the 0.5 ppm detection level of the flame AA and an analysis of the recovery solution using flame AA showed that greater than 95% of the Tl originally in the 100 ml Tl solution was in the 5 ml recovery solution.

Although the invention has been described and illustrated by reference to certain specific silica gel-bound oxygen donor macrocyclic ligands of Formula 1 and the process of using them, other analogs of these oxygen donor macrocycle ligands falling within the scope of Formula 1 are also within the scope of the compounds and processes of the invention as defined in the following claims.

We claim:

1. A method for the concentration, removal and separation of desired metals selected from the group consisting of alkali metal, alkaline earth metal Pb and Tl present as cations from a source solution which comprises (a) bringing said source solution having a first volume into contact with a compound comprising an oxygen donor macrocycle-containing ligand covalently bonded to a solid inorganic support matrix represented by the formula:

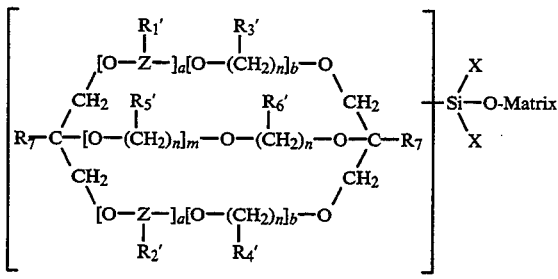

wherein, $R_{3'}$, $R_{4'}$, $R_{5'}$ and $R_{6'}$ is H or a spacer formed from the reaction of a member selected from the group consisting of allyloxymethyl, alkylthio, alkylamino, carboxy, carboxyalkyl and epoxyalkyl with an —Si(X)(X)— moiety used for attachment to —O—Matrix, $R_7$ is a member selected from the group consisting of H, or alkyl, Z is a member selected from the group consisting of o-phenylene and o-naphthylene, $R_{1'}$ and $R_{2'}$ is H or a spacer formed from the reaction of a member selected from the group consisting of allyl, alkenyl, carboxy, carboxyalkyl, allyloxy, aminoalkyl, hydroxy, thio and alkylthio with an —Si(X)(X)— moiety used for attachment to —O—Matrix, n is an integer of from 2 to 4, a is an integer of 0 or 1, b is an integer of 0 to 3 with the proviso that b must be at least 1 when a is 0, and m is an integer of 0 to 5, Matrix is a solid support material selected from the group consisting of sand, silica gel, glass, glass fibers, alumina, nickel oxide, zirconia, titania, and equivalent substances, X is a member selected from the group consisting of Cl, Br, I, alkyl, alkoxy, substituted alkyl, substituted alkoxy and O—matrix, with the further proviso that one but not more than two of the $R_{1'}$ through $R_{6'}$ groups must be a spacer reacted with an —Si(X)(X)— moiety used for attachment to —O—Matrix and remaining $R_{1'}$ through $R_{6'}$ groups are H; said ligand portion of said compound having an affinity for said alkali metal, alkaline earth metal, Pb and/or Tl cations to form a complex between the alkali metal, alkaline earth metal, Pb and/or Tl cations and said oxygen donor macrocyclic containing ligand portion of said compound;

(b) removing source solution from contact with said compound to which said desired metal cations have been complexed; and (c) contacting said compound having said desired metal cations complexed thereto with a smaller volume of an aqueous receiving solution in which said desired metal cations are either soluble or which has greater affinity for such desired metal cations than does the oxygen donor macrocyclic ligand thereby quantitatively stripping such cations from the ligand and recovering said desired metal cations in concentrated form in said receiving solution.

2. A method according to claim 1 wherein n is 2, b is 0, 2, $R_{2'}$, $R_{5'}$ and $R_{6'}$ are H and $R_{1'}$ is a spacer formed from the reaction of a member selected from the group consisting of allyl, alkenyl, carboxy, carboxyalkyl, allyloxy, aminoalkyl, hydroxy, thio and alkylthio with an —Si(X)(X)— moiety used for attachment to —O—Matrix.

3. A method according to claim 2 wherein m is a integer of 1 to 4.

4. A method according to claim 3 wherein Z is o-phenylene.

5. A method according to claim 4 wherein $R_{1'}$ is propyl.

6. A method according to claim 3 wherein Z is o-naphthylene.

7. A method according to claim 6 wherein $R_{1'}$ is propyl

8. A method according to claim 1 wherein n is 2, a is 0, at least one but not more than two of $R_{3'}$, $R_{4'}$, $R_{5'}$ and $R_{6'}$ is spacer formed from the reaction of a member selected from the group consisting of allyloxymethyl, alkylthio, alkylamino, carboxy, carboxyalkyl and epoxyalkyl with an —Si(X)(X)— moiety used for attachment to —O—Matrix with the remaining $R_{3'}$, $R_{4'}$, $R_{5'}$ and $R_{6'}$ being H.

9. A method according to claim 8 wherein m is 1 to 4.

10. A method according to claim 9 wherein b is 1.

11. A method according to claim 9 wherein b is 2.

12. A method according to claim 9 wherein one b is 1 and the second b is 2.

13. A method according to claim 1 wherein said compound is contained in a packed column and wherein said source solution is first flowed through said packed column to allow the formation of a complex between said desired metal cations and said compound followed by the stripping of said desired metal cations from said compound by flowing said volume of said receiving solution through said packed column and recovering desired metal cations in concentrated in said receiving solution.

14. A method according to claim 13 wherein said alkali metal is a member selected from the group consisting of sodium, potassium, rubidium, and cesium, said alkaline earth metal is a member selected from the group consisting of magnesium, calcium, strontium and barium.

15. A method according to claim 13 wherein said source solution contains alkali metal cations which are removed in concentrated form.

16. A method according to claim 13 wherein said source solution contains alkaline earth metal cations which are removed in concentrated form.

17. A method according to claim 13 wherein said source solution contains Pb cations which are removed in concentrated form.

18. A method according to claim 13 wherein said source solution contains Tl cations which are removed in concentrated form.

19. A method according to claim 1 wherein said receiving solution is any solution having properties which allow for the desired metal cations to be broken from said compound in said column.

20. A method according to claim 19 wherein said receiving solution is selected from the group consisting of aqueous solutions of 0.01 to 0.1M $Pb(NO_3)_2$ in 1M $HNO_3$, 0.03 to 0.3M $Li_4$ EDTA, 0.03 to 0.5M $Li_5$ DTPA, 0.01 to 0.1M $BaCl_2$ in 1M HCl, and 0.05 to 0.5M $Na_4P_2O_7$ and mixtures thereof.

21. A compound comprising an oxygen donor macrocycle-containing ligand covalently bonded to a solid inorganic support matrix represented by the formula:

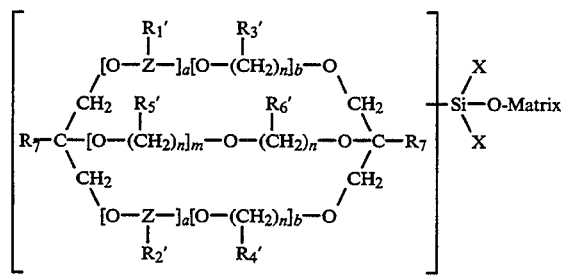

wherein, $R_{3'}$, $R_{4'}$, $R_{5'}$ and $R_{6'}$ is H or a spacer formed from the reaction of a member selected from the group consisting of allyloxymethyl, alkylthio, alkylamino, carboxy, carboxyalkyl and epoxyalkyl with an $-Si(X)(X)-$ moiety used for attachment to $-O-$Matrix, $R_7$ is a member selected from the group consisting of H, or alkyl, Z is a member selected from the group consisting of o-phenylene and o-naphthylene, $R_{1'}$ and $R_{2'}$ is H or a spacer formed from the reaction of a member selected from the group consisting of allyl, alkenyl, carboxy, carboxyalkyl, allyloxy, aminoalkyl, hydroxy, thio and alkylthio with an $-Si(X)(X)-$ moiety used for attachment to $-O-$Matrix, n is an integer of from 2 to 4, a is an integer of 0 or 1, b is an integer of 0 to 3 with the proviso that b must be at least 1 when a is 0, and m is an integer of 0 to 5, Matrix is a solid support material selected from the group consisting of sand, silica gel, glass, glass fibers, alumina, nickel oxide, zirconia, titania, and equivalent substances, X is a member selected from the group consisting of Cl, Br, I, alkyl, alkoxy, substituted alkyl, substituted alkoxy and O—matrix, with the further proviso that one but not more than two of the $R_{1'}$ through $R_{6'}$ groups must be a spacer reacted with an $-Si(X)(X)-$ moiety used for attachment to $-O-$Matrix and remaining $R_{1'}$ through $R_{6'}$ groups are H.

22. A compound according to claim 21 wherein n is 2, b is 0, $R_{2'}$, $R_{5'}$ and $R_{6'}$ are H and $R_{1'}$ is a spacer formed from the reaction of a member selected from the group consisting of allyl, alkenyl, carboxy, carboxyalkyl, allyloxy, aminoalkyl, hydroxy, thio and alkylthio with an $-Si(X)(X)-$ moiety used for attachment to $-O-$Matrix.

23. A compound according to claim 22 wherein m is a integer of 1 to 4.

24. A compound according to claim 23 wherein Z is o-phenylene.

25. A compound according to claim 24 wherein $R_{1'}$ is propyl.

26. A compound according to claim 23 wherein Z is o-naphthylene.

27. A compound according to claim 26 wherein $R_{1'}$ is propyl.

28. A compound according to claim 21 wherein n is 2, a is 0, at least one but not more than two of $R_{3'}$, $R_{4'}$, $R_{5'}$ and $R_{6'}$ is spacer formed from the reaction of a member selected from the group consisting of allyloxymethyl, alkylthio, alkylamino, carboxy, carboxyalkyl and epoxyalkyl with an $-Si(X)(X)-$ moiety used for attachment to $-O-$Matrix, with the remaining $R_{3'}$, $R_{4'}$, $R_{5'}$ and $R_{6'}$ being H.

29. A compound according to claim 28 wherein m is 1 to 4.

30. A compound according to claim 29 wherein b is 1.

31. A compound according to claim 29 wherein b is 2.

32. A compound according to claim 29 wherein one b is 1 and the second b is 2.

* * * * *